(12) United States Patent
Andlauer et al.

(10) Patent No.: US 10,794,922 B2
(45) Date of Patent: Oct. 6, 2020

(54) DEVICE FOR AGITATING AND COLLECTING LIQUID SAMPLES

(71) Applicant: HORIBA ABX SAS, Montpellier (FR)

(72) Inventors: Sylvain Andlauer, Le Crès (FR); Florent Beauducel, Montpellier (FR); Philippe Benezeth, Caissargues (FR)

(73) Assignee: HORIBA ABX SAS, Montpellier (FR)

( * ) Notice: Subject to any disclaimer, the term of this patent is extended or adjusted under 35 U.S.C. 154(b) by 269 days.

(21) Appl. No.: 15/775,214

(22) PCT Filed: Nov. 9, 2016

(86) PCT No.: PCT/FR2016/052911
§ 371 (c)(1),
(2) Date: May 10, 2018

(87) PCT Pub. No.: WO2017/081410
PCT Pub. Date: May 18, 2017

(65) Prior Publication Data
US 2018/0340948 A1  Nov. 29, 2018

(30) Foreign Application Priority Data

Nov. 13, 2015 (FR) ..................... 15 60889

(51) Int. Cl.
*G01N 35/00* (2006.01)
*G01N 35/10* (2006.01)

(52) U.S. Cl.
CPC ..... *G01N 35/0099* (2013.01); *G01N 35/0092* (2013.01); *G01N 2035/0093* (2013.01);
(Continued)

(58) Field of Classification Search
CPC ....... G01N 2035/0093; G01N 35/0092; G01N 35/0099; G01N 2035/00524; G01N 2035/1058
See application file for complete search history.

(56) References Cited

U.S. PATENT DOCUMENTS

| 5,578,268 A | 11/1996 | Champseix et al. |
| 5,665,309 A * | 9/1997 | Champseix ............ G01N 35/04 141/130 |

(Continued)

FOREIGN PATENT DOCUMENTS

| EP | 0726453 A1 | 8/1996 |
| EP | 1655071 A1 | 5/2006 |

(Continued)

OTHER PUBLICATIONS

International Search Report issued in International Patent Application No. PCT/FR2016/052911, dated Feb. 21, 2017 (8 pages).

*Primary Examiner* — Justin N Olamit
(74) *Attorney, Agent, or Firm* — Arent Fox LLP

(57) ABSTRACT

A device for agitating and collecting biological liquid samples comprises an agitator of racks of tubes and a sampling apparatus capable of collecting a biological liquid sample in a tube. The device also comprises a scheduler arranged to specify an order of sampling from the tubes independently of the order in which the tubes are positioned in the respective racks and the order in which the racks are inserted into the device. The scheduler is arranged to control the agitator and the sampling apparatus to process the tubes in accordance with the sampling order.

19 Claims, 5 Drawing Sheets

Figure 1:
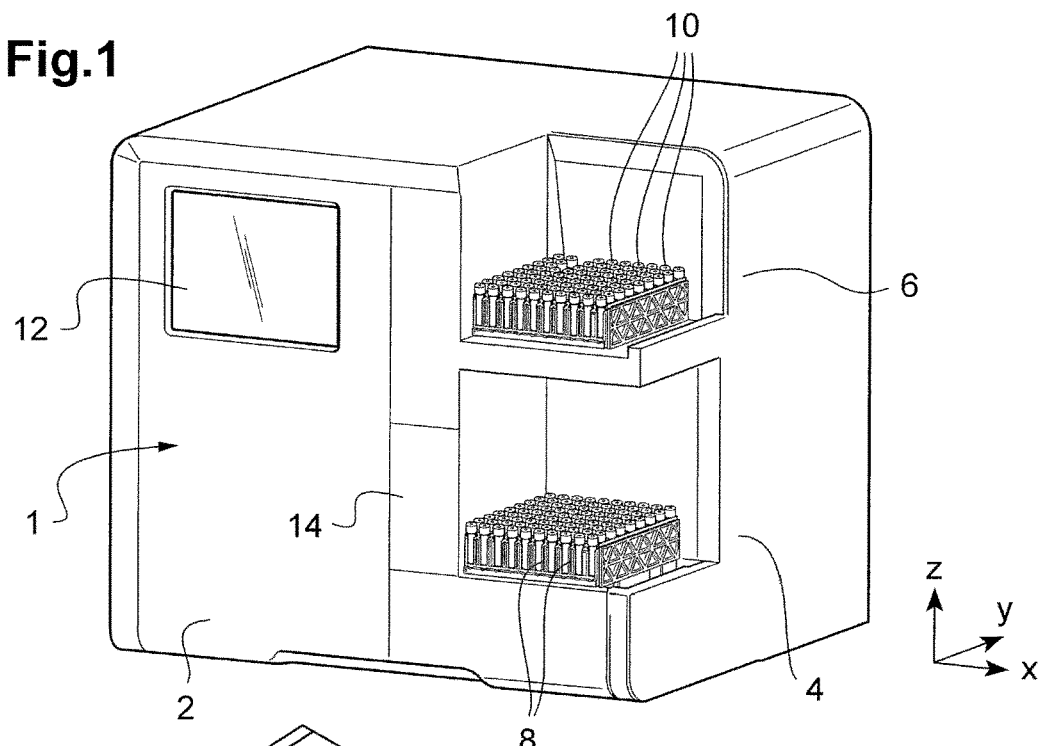

(52) U.S. Cl.
CPC .............. *G01N 2035/00524* (2013.01); *G01N 2035/1058* (2013.01)

(56) References Cited

U.S. PATENT DOCUMENTS

| | | | |
|---|---|---|---|
| 6,588,625 B2 * | 7/2003 | Luoma, II ................. | B01L 9/00 221/9 |
| 9,952,238 B2 * | 4/2018 | Le Comte ........ | G01N 35/00594 |
| 2009/0142844 A1 | 6/2009 | Le Comte | |
| 2014/0133264 A1 | 5/2014 | Kontos et al. | |
| 2017/0246600 A1 * | 8/2017 | Jakobsen ................ | B01F 9/002 |

FOREIGN PATENT DOCUMENTS

| | | |
|---|---|---|
| EP | 2693220 A2 | 2/2014 |
| EP | 2853899 A1 | 4/2015 |
| FR | 2888328 A1 | 1/2007 |
| WO | WO 93/25885 A1 | 12/1993 |
| WO | WO 03/100382 A1 | 12/2003 |
| WO | WO 2017/081411 A1 | 5/2017 |

* cited by examiner

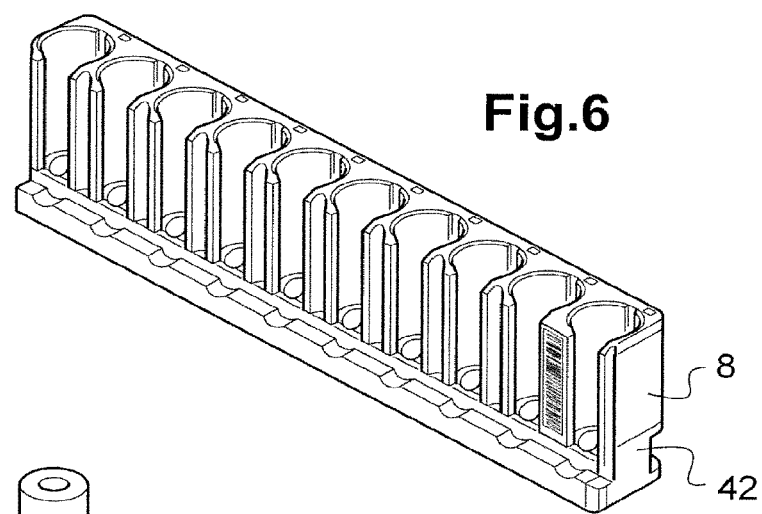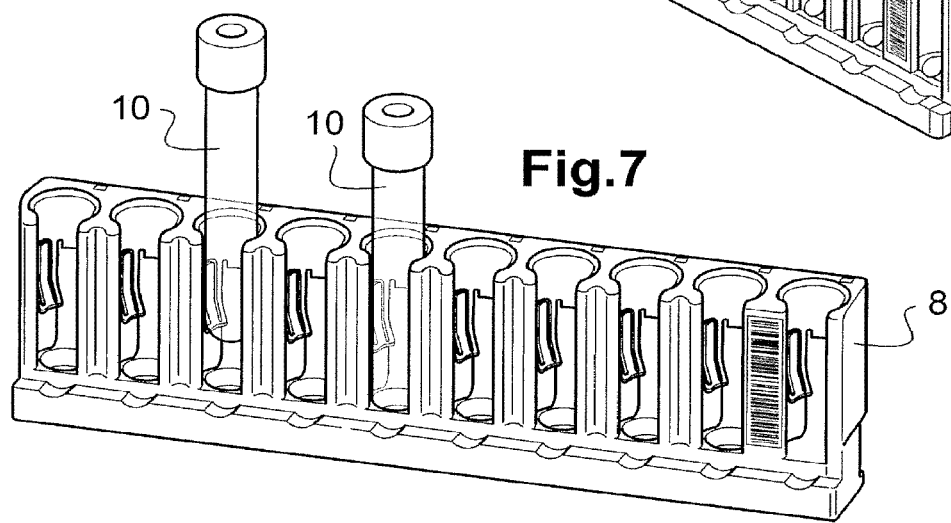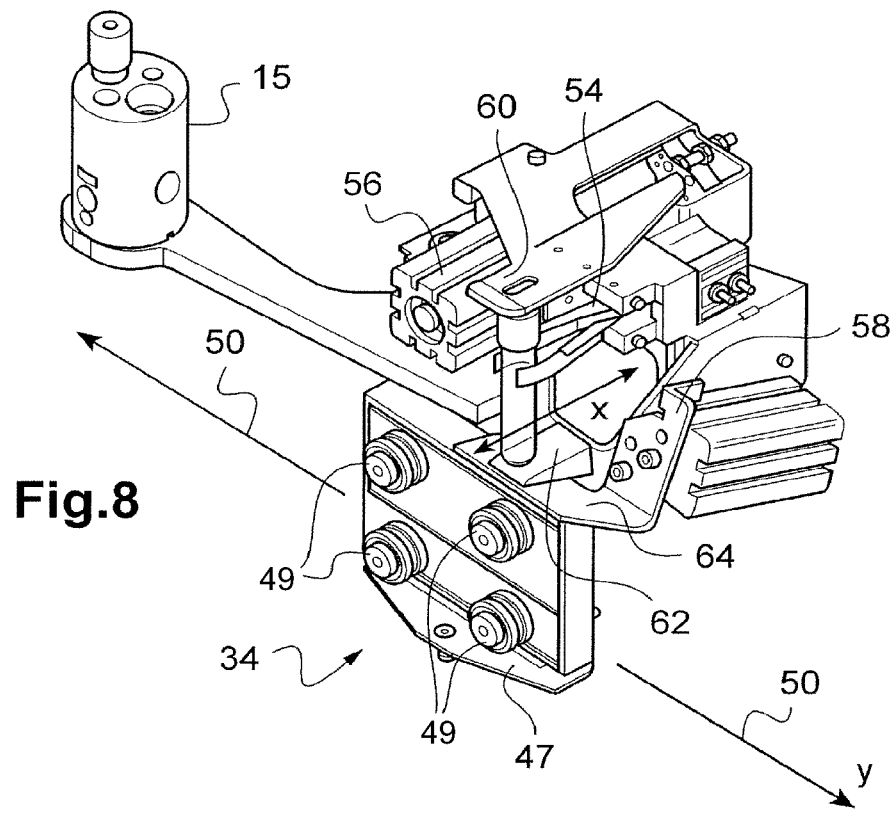

DEVICE FOR AGITATING AND COLLECTING LIQUID SAMPLES

CROSS REFERENCE TO RELATED APPLICATIONS

This application is a 35 U.S.C. 371 National Phase of PCT Application No. PCT/FR2016/052911 filed Nov. 9, 2016, which claims benefit to FR Application No. 1560889 filed Nov. 13, 2015, the disclosure of which is hereby incorporated by reference in its entirety.

The invention concerns the area of collecting biological liquid samples, in particular a body fluid such as blood.

Over the past few decades, blood product analysis units have become increasingly automated. In order to meet the demand for blood tests, requirements with respect to sampling capacity and multi-analysis have exploded. The result is that modern units are assessed based on their analysis speed (number of tubes per hour) and their capacity to carry out multiple types of tests on a single machine.

Developments in this area first favored the processing speed, then the addition of different types of tests. Certain tasks in the sequence to be carried out by the device limit the capacity to increase speed by adding material resources.

It is therefore necessary to agitate the tubes for a certain period of time so that the sample blood product is homogeneous at the time of sampling. Conversely, an agitated sample must not be left immobile for too long prior to sampling, or the benefits of agitation will be lost. In addition, agitation cannot be accelerated beyond a certain speed, or the sample may deteriorate and/or the mixture obtained will be insufficient.

In order to increase speed while taking these limitations into account, agitators with two tubes were proposed, followed by tube supports, also referred to as racks, in order to agitate multiple tubes at the same time. The racks were designed in various configurations until the limits imposed by the agitation and space requirements were reached.

The agitators were then modified so that they could receive two racks simultaneously. In this manner, maintenance of speed during transition between two successive racks was improved, at the same time allowing satisfactory agitation to be maintained.

Devices were progressively automated until the limits of sequential processing of the racks were reached. Nevertheless, these improvements have reached their peak not only in terms of pure speed, but also in terms of management of exceptional cases.

The term exceptional case is understood to mean, for example, a case in which a rack contains only one tube or a tube must be examined urgently without taking into account the racks already processed, or a case in which a tube has already been sampled and testing must be repeated because the result of said testing is suspect (for example, a measurement at the margin of the detection limit).

The situation of a "unique tube" also applies to cases in which a rack contains tubes requiring tests not carried out by the device and in which one single tube on a rack can be effectively analyzed by the device.

The invention improves this situation. For this purpose, the invention provides a device for agitating and collecting biological liquid samples comprising an agitator of racks of tubes and a sampling means capable of collecting a biological liquid sample in a tube. This device also comprises a scheduler configured to specify an order of sampling from the tubes independently of the order in which the tubes are positioned in the respective racks and/or the order of insertion of the racks into the device and configured to control the agitator and the sampling means in order to process the tubes according to this sampling order.

This device is particularly advantageous because it completely changes the way in which management of the tubes is configured. Specifically, in the prior art, tubes were always analyzed sequentially according to their position in the racks, and racks were always processed sequentially as well. The devices were seen as automated mechanical units intended to process the racks inserted by the user as quickly as possible.

The invention radically changes the manner in which sampling devices operate by allowing processing that is no longer strictly sequential, but is indexed so as to maintain full speed regardless of the situation in question. Specifically, the scheduler makes it possible to process the tubes on the racks in an intelligent order depending on the general processing status of the device, but also based on the steps and tests to be carried out on the tubes, or based on other parameters.

This is no longer a case of automated mechanical units processing tubes one after the other as quickly as possible; the invention provides an intelligent unit that adapts to operating conditions in order to maintain the maximum speed regardless of said conditions.

According to various embodiments, the device can have one or more of the following characteristics:
- the device also comprises a changer capable of gripping a tube on a rack received in the agitator and moving it to the sampling means, wherein the scheduler is configured to control the changer in order to grip the tubes according to the sampling order,
- the agitator is capable of agitating at least three racks simultaneously,
- the agitator is capable of moving between a position for inserting the racks into the device and a position for removing the racks from the device,
- the device also comprises a lifting mechanism arranged to move the agitator between the positions for inserting and removing the racks,
- the changer comprises a projection arranged to cooperate with a rack base for removing a rack of the agitator when the latter is in position for removing the racks,
- the device also comprises a loader equipped with a pusher arranged to cooperate with a base of a rack in order to insert it into the agitator when the latter is in position for inserting the racks,
- the changer comprises a clamp for removing a tube of a rack on which it is received,
- the changer comprises a sensor arranged to read the data pertaining to the tubes received on a rack in the agitator, and/or on the rack itself,
- the changer comprises a barrel for receiving a tube to be treated on a priority basis, and
- the agitator receives a rack serving as a buffer for the scheduler in specifying the order of gripping the tubes.

The invention also concerns a method for agitating and sampling of tubes comprising the following steps:
a. insertion of at least two racks, each receiving at least one tube containing at least one biological liquid, into a device for agitating and collecting biological liquid samples,
b. specification of a sampling order of the tubes received in the device independently of their position on the racks that receive them and/or the order of insertion of these racks into the device,
c. collection of biological liquid samples in the tubes received in the device according to the sampling order.

Figure 2:
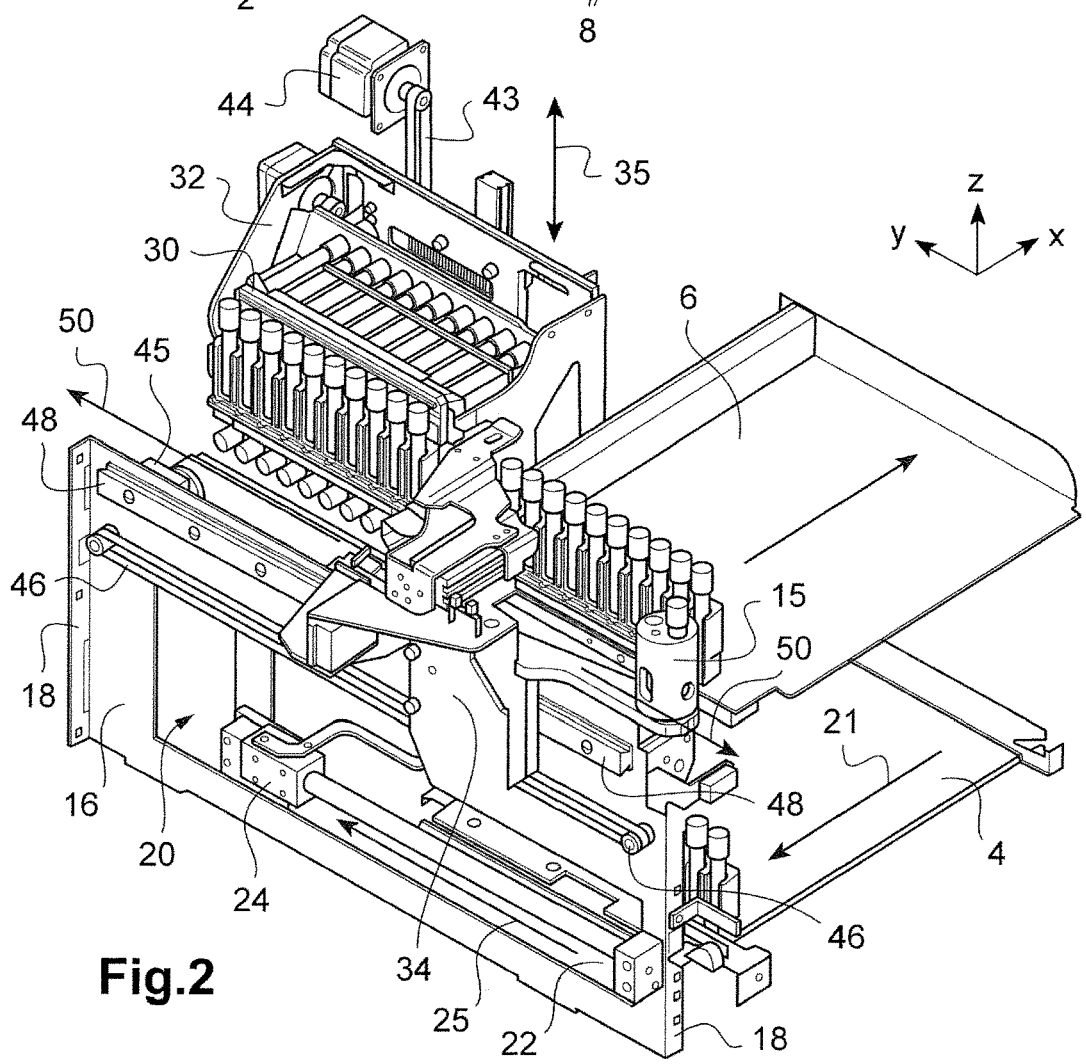
Figure 3:
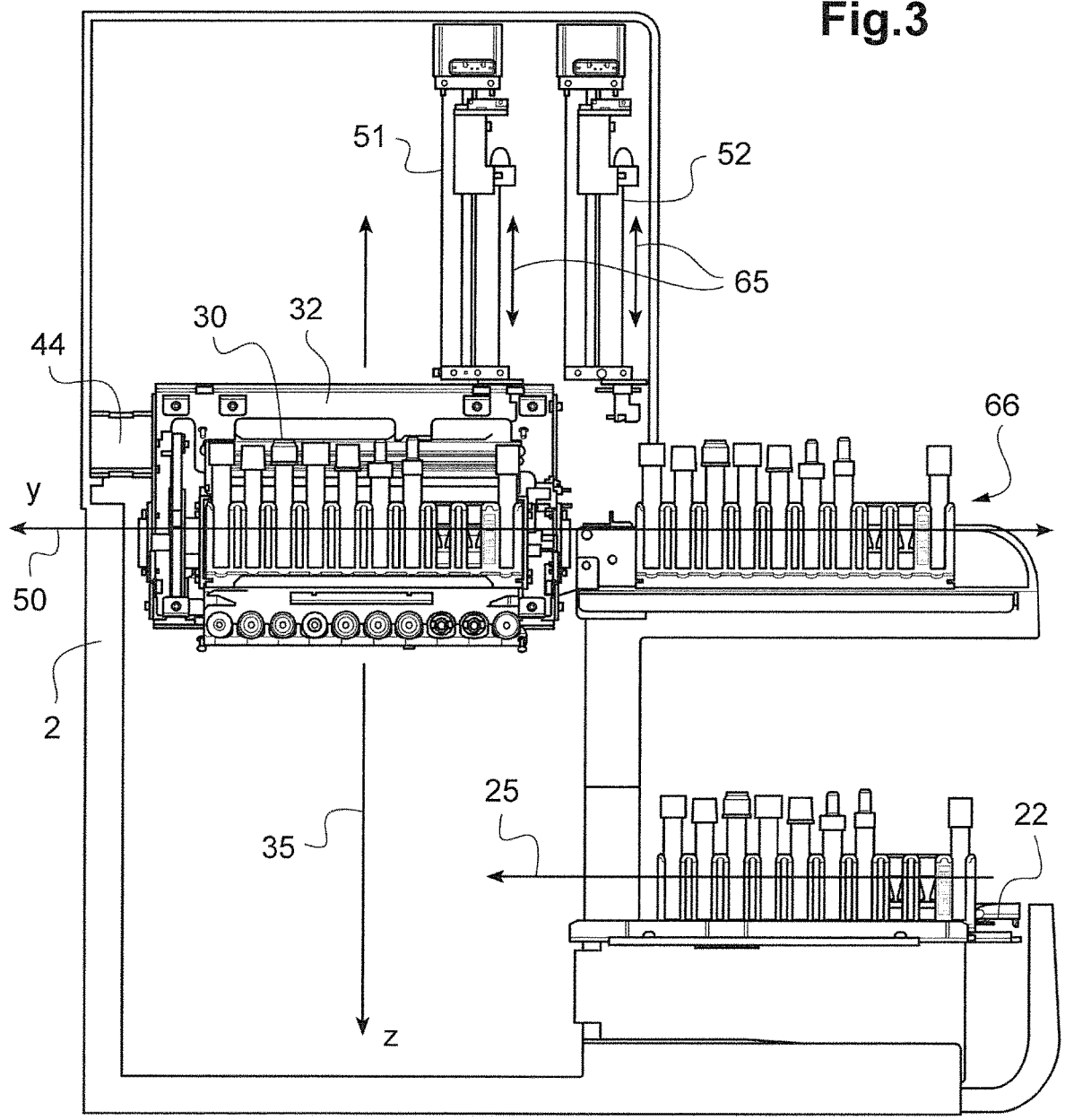
Figure 4:
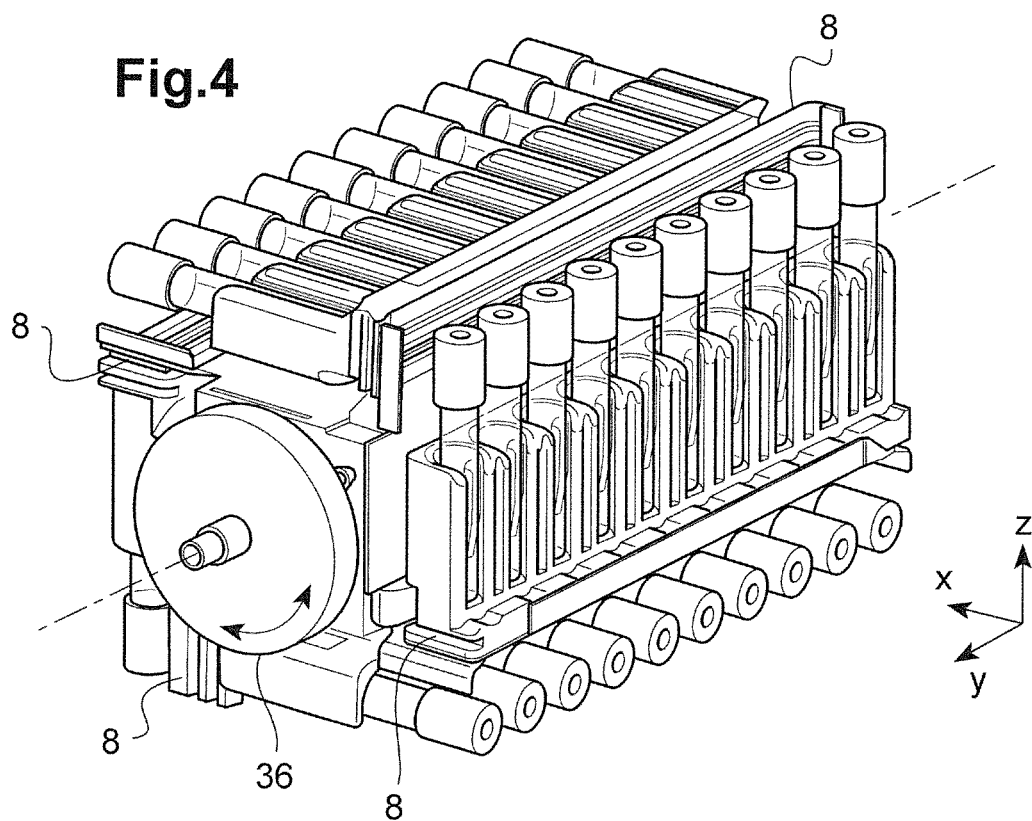
Figure 5:
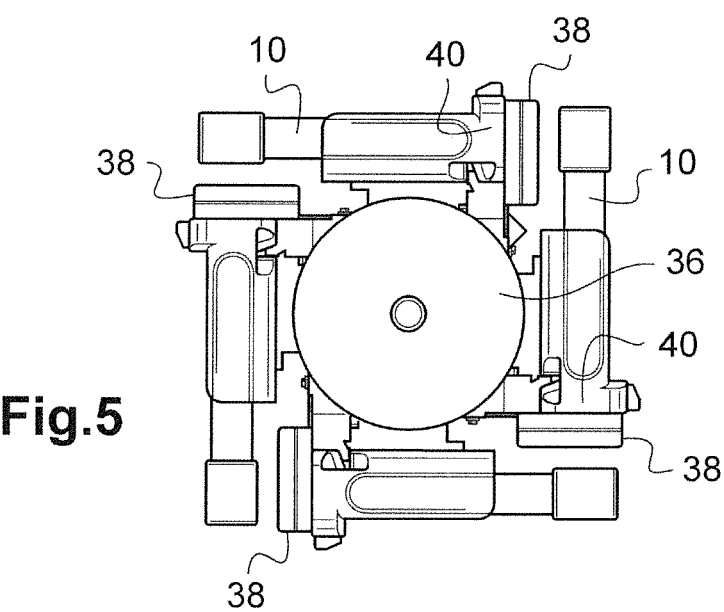
Figure 9:
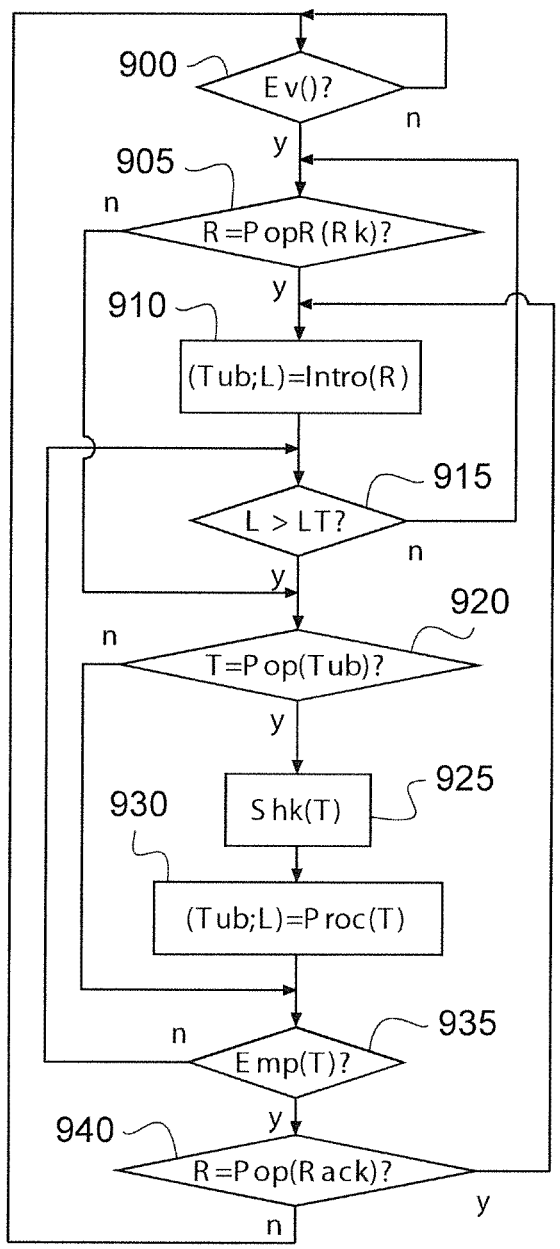
Figure 10:
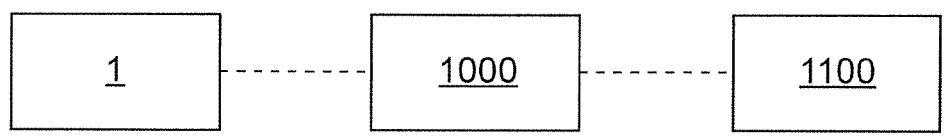

Other characteristics and advantages will be clarified by reading the following description, taken from examples given on an illustrative rather than a limitative basis, which refers to drawings showing the following:

FIG. 1 shows a perspective view of a device according to the invention,

FIG. 2 shows a perspective view of a portion of the components of the device of FIG. 1, FIG. 3 shows a side view of the inside of the device of FIG. 1, FIGS. 4 and 5 show a perspective view and a side view respectively of an agitator shown in FIGS. 2 and 3, FIGS. 6 and 7 show a perspective view of a tube rack of FIGS. 4 and 5 respectively with and without tubes, FIG. 8 shows a perspective view of the changer of FIG. 2, FIG. 9 shows an example of a function implemented by the scheduler, and FIG. 10 shows a schematic view of an apparatus comprising a plurality of devices, at least one of which is in accordance with FIG. 1.

The drawings and the following description for the most part contain definite elements. They can serve not only to improve understanding of the present invention, but to contribute towards defining it if necessary.

FIG. 1 shows a perspective view of a device 1 according to the invention. A locator XYZ makes it possible to identify the various orientations of the figures on which it is shown.

The device 1 comprises a housing 2 of generally cuboid shape that has two recesses respectively for a loading tray 4 and an unloading tray 6. The trays 4 and 6 make it possible respectively to insert and retrieve the racks 8 of tubes 10 containing the biological liquids and blood products that the device 1 is to sample and analyze. The racks 8 are arranged parallel to one another on the trays 4 and 6 along their length, i.e. along the Y axis.

In the example shown in FIG. 1, the racks are inserted into the machine from right to left on the loading tray 4, i.e. the rack 8 farthest to the left of the loading tray 4 is inserted first, and the one farthest to the right is inserted last. For the unloading tray 6, the situation is reversed: it is the rack 8 farthest to the right that has been ejected first, while the rack 8 farthest to the left is the one ejected most recently. In the example described here, because of its arrangement inside the device 1, the loading tray 4 is located in the lower part of the device 1, while the unloading tray 6 is located in the upper part. Alternatively, the functions of the trays 4 and 6 could be reversed, or the trays could play roles depending on the operating mode of the device 1, being used for loading or unloading of the racks 8 depending on the situation.

The housing 2 also has a screen 12 that makes it possible to control the device 1 and monitor the operating status thereof. Finally, the housing 2 has a hatch 14 that allows the insertion of a "priority tube." A priority tube is a single tube that a user wishes to process on a priority basis with respect to the others. As can be seen in FIGS. 2 and 8, this tube is received in a barrel 15 that is part of the device 1. The hatch 14 can also be used for inserting tubes whose processing is incompatible with the use of a rack, for example tubes for pediatric use.

FIG. 2 shows a perspective view of a portion of the components contained inside the housing 2 of the device 1. As can be seen in this figure, the device 1 receives a wall 16 that chiefly runs in direction Y and is located approximately at the level of the end of the loading tray 4. The wall 16 has two arms 18 that allow it to be fixed in place on the housing 1 and an opening 20 through which a loader 22 can be seen.

The loader 22 is attached to the wall 16 approximately at the level of the loading tray 4 on the side opposite thereto. When a rack 8 is pushed in the direction of the arrow 21 from the tray 4, it is received directly by the loader 22. The loader 22 comprises an actuator 24 capable of moving in the direction Y that controls a projection (not shown) through the opening 20 that pushes a rack 8 received in the loader 22 in the direction indicated by the arrow 25 toward the inside of the device 1, as will be seen below.

The device 1 also comprises an agitator 30, a lifting mechanism 32, and a changer 34. The agitator 30 has the function of mixing the racks of tubes 8 it receives by rotation around an axis approximately parallel to Y.

As can be seen in FIGS. 4 and 5, the agitator 30 can receive 4 racks 8, each disposed at an angle of approximately 90° with respect to the others. Alternatively, the agitator 30 could be arranged to receive only 3 racks 8 or more than 4 racks. The agitator 30 comprises a motor 36 that is configured to apply rotation that allows mixing of the contents of the tubes 10 received on the racks 8 it supports.

As will be seen below, the motor 36 can also be activated in order to position a selected rack 8 opposite the changer 34. In order to receive the racks 8, the agitator 30 comprises four supports 38, each having a guide 40 extending in the Y direction. The supports 38 are connected to the motor 36 such that rotation of the latter drives rotation of the supports 38 and the racks 8 they receive.

As can be seen in FIGS. 6 and 7, the racks 8 have a T-shaped base 42 that fits into one of the guides 40 of the agitator 30. In this manner, in order to insert a rack 8, one need only place the desired support 38 of the agitator 30 opposite the loader 22, and the actuator 24 is activated in order to push the rack 8 into place in the corresponding guide 40.

The agitator 30 is displaced inside the device 1 by the lifting mechanism 32 as indicated by the arrow 35 in FIG. 2. The lifting mechanism 32 causes the agitator 30 to move along the Z axis between a low position in which it can receive a rack 8 of the loader 22 and a high position in which the changer 34 can sample a tube 10 on a rack 8. The lifting mechanism 32 is driven by a belt 43 and a motor 44.

FIG. 8 shows a perspective view of the changer 34 along an axis that is a mirror image of the view in FIG. 2.

The changer 34 comprises a motor 45 that drives a belt 46 that is connected to an attachment portion 47. The changer 34 has wheels 49 that are received in a rail 48 visible in FIG. 2 mounted on the wall 16. In this manner, the changer 34 moves along the Y axis as indicated by the arrow 50.

The main function of the changer 34 is the sampling of a tube 10 from a rack 8 received in the agitator 30 and the bringing of this tube 10 toward a first sampling means 51 or a second sampling means 52 (visible in FIG. 3).

In order to carry out sampling of the tubes 10, the changer 34 comprises a clamp 54 that is moved along the X axis by means of a driver 56. In order to identify the tube 10 to be sampled, the changer 34 uses a sensor 58 that reads a bar code or another means of optical identification carried by the tubes 10. The clamp 54 could also be replaced by another gripping means, for example a vacuum nozzle, a magnetic device, etc. The sensor 58 could also be different, and could for example be an RFID sensor.

Finally, the changer 34 comprises an upper stop 60 and a lower stop 64 that limit the movement of the tube during the insertion and withdrawal of the sampling needle, as well as a pusher 62. The pusher 62 makes it possible to eject a rack 8 of the agitator 30 toward the unloading tray 6.

In order to bring a tube 10 of the agitator 30 toward one of the sampling means 51 and 52, the lifting mechanism 32 moves the agitator 30 in a high position at the level of the changer 34, and the motor 36 of the agitator 30 positions the desired rack 8 opposite the changer 34. The changer 34 then moves along the Y axis until the tube 10 sought is identified by means of the sensor 58. Once the tube 10 has been identified, the driver 56 moves the clamp 54, which grips the tube 10, and the lifting mechanism 32 causes the agitator 32 to descend in direction Z such that the tube 10 is withdrawn from the rack 8.

The changer 34 is then moved in direction Y below the first sampling means 51 or the second sampling means 52. Once the changer 34 has stopped, the needle of the sampling means moves along the Z axis as indicated by the arrows 65 in order to carry out sampling in the tube 10. Finally, by means of a series of reverse steps, the tube 10 is put back in the rack 8 on the agitator 30.

In order to withdraw a rack 8 from the agitator 30, the changer 34 is moved all the way left along the Y axis according to the view in FIGS. 2 and 3. The lifting mechanism 32 then moves the agitator 30 in a high position at the level of the changer 34, and the motor 36 of the agitator 30 positions the rack sought 8 opposite the changer 34. Finally, the changer 34 is moved to the right along the Y axis, with the pusher 62 progressively pushing the rack 8 outside the support 38 that receives it until it reaches an unloading zone 66 of the unloading tray 6, and a driver not shown moves the withdrawn rack 8 along the X axis as indicated by the arrow 67 in order to withdraw the rack 8 from the device 1.

All of the steps are coordinated by a scheduler that can be configured in the form of a computer program. The function of the scheduler is to coordinate the loader 22, the agitator 30, the lifting mechanism 32, and the changer 34 as well as the sampling means 51 and 52 in order to insert the racks 8, agitate them, and carry out sampling.

In the example described here, the scheduler is integrated into the housing of the device 1. Alternatively, the scheduler could be in a remote configuration and be operated from a computer or a controller outside the housing of the device 1 and in communication with the latter either by wire or wirelessly. In addition, such a computer or controller could control a plurality of devices 1 to which it is connected, with said devices being independent of one another.

When a rack 8 is loaded into the agitator 30, it is moved by the lifting mechanism 32 to the level of the changer 34, which uses the sensor 58 to determine which tubes 10 are present on the rack 8 and the tests required for these tubes.

The scheduler thus knows exactly which tubes are present on the racks 8 and can specify a sampling and testing sequence that makes it possible to optimize the speed of the device 1.

Specifically, if a priority tube is inserted via the hatch 14, the scheduler can "pause" the sequence in progress and prepare for sampling of the priority tube as soon as sampling of the tube in progress is completed and said tube has been put back in its rack.

FIG. 9 shows an example function implemented by the scheduler.

This figure shows an operating loop of the scheduler that begins with a step 900 in which a function Ev( ) tests for the presence of a testing launch event.

When such an event is detected, a function PopR( ) is executed in a step 905. The function PopR( ) receives as an argument an Rk list. The Rk list contains the identifiers of the racks 8 of tubes 10 currently received by the device 1. In the example described here, the racks 8 are arranged by order of priority in the Rk list, such that the first rack 8 is the one that must be treated on a priority basis, and so forth.

The management of the Rk list and the insertion of the racks 8 therein can be controlled by the scheduler or be automated. In the example described here, the racks 8 received on the loading tray 4 are classified in order of proximity to the entrance of the device 1, while when a priority rack or a priority tube is inserted, it is placed at the top of the Rk list. Other methods of managing the Rk list may also be used.

The function PopR( ) unstacks the Rk list, and the resulting rack identifier 8 is stored in a variable R. Next, in a step 910, a function Intro( ) is executed. The function Intro( ) receives the variable R as an argument and returns a Tub list and a variable L.

In the example described here, the function Intro( ) instructs the device 1 to insert the rack 8 whose identifier is given the variable R and to proceed with mixing of the tubes 10 it carries.

In the example described here, this insertion comprises the reading of labels affixed to the tubes 10 allowing determination of the tubes 10 in question, as well as the required tests. The identifiers of the tubes 10 are stored in the Tub list for subsequent testing. The reading of the tubes 10 also allows determination of the required duration of the tests to be carried out for the rack 8 designated by the variable R, and this required time is added to the variable L, which receives the estimated time in order to analyze all of the tubes loaded into the device 1.

The function Intro( ) is capable of modifying the Tub list based on the course of processing since the last execution of the function Intro( ) based on one or more of the following criteria:

the type of tests to be carried out on the newly inserted tubes,
the priority status of the one or plurality of newly inserted tubes,
the degree of agitation of the tubes in the device,
the origin of the rack of newly inserted tubes (tray, priority tube, etc.),
the residence time of each tube present in the device.

Other criteria can be taken into account according to the circumstances.

Next, in a step 915, a test compares the variable L to a threshold LT. The threshold LT corresponds to the estimated duration required for agitating the tubes of a rack 8. Specifically, if the total duration of the remaining tests is less than this duration (on the order of two minutes in the example described here), it is preferable to load a new rack in order to agitate said rack as quickly as possible and ensure the maximum operating speed of the device 1.

If L is less than LT, then step 910 is repeated. In the opposite case, testing of a tube is initiated. For this purpose, in a step 920, a test determines whether the Tub list is empty by means of a function PopT( ) that receives the Tub list as an argument.

If the Tub list is not empty, then the function PopT( ) determines which tube must be tested next. For example, in the case of a priority rack or a priority tube inserted in the step 910, the Tub list can receive the identifiers of these tubes at a location such that they will be processed first as soon as their agitation is completed. In this scenario, the Tub list is quite simply unstacked, and the identifier of the corresponding tube is returned in a variable T.

In other embodiments, the function PopT( ) can be more complex and can decide based on intrinsic and/or extrinsic algorithms the next tube to be analyzed.

Next, in a step 925, a function Shk( ) determines whether the tube designated by the variable T has been sufficiently agitated. If this is not the case, additional agitation is carried out.

The tube designated by the variable T is then analyzed in a step 930 by a function Proc( ). The function Proc( ) instructs the device 1 to search for the tube with the identifier T on its rack in order to bring it to one of the two sampling means 51 and 52 and to put it back in its rack once the testing has been carried out. In order to search for the tube with the identifier T, the device 1 can order reading of the labels of the tubes on the rack in question or use an intermediate table associating each tube received in the device 1 with a given location on one surface of the agitator 30. In the example described here, the sampling means 51 is dedicated to direct tests, while the sampling means 52 is dedicated to repeating tests.

The function Proc( ) also updates the Tub list, either by deleting the identifier T or by replacing it if it is necessary to repeat the test. The variable L is also updated accordingly by subtracting from it the duration of the testing that was planned for the tube with the identifier T.

Finally, in a step 935, a function Emp( ) determines whether the Tub list is empty. If this is not the case, the loop starts again with step 915 in order to determine whether a new rack must be loaded. If not, in a step 940, a step identical to step 910 is carried out. When there is no longer a rack available, all of the tests have been carried out, and the device 1 starts over by waiting for the next event in step 900. If not, the loop starts again with step 910 for inserting this rack.

If the agitator 30 has rack-receiving holders, one of them can be left permanently empty in order to serve as a buffer used for temporarily storing a tube as needed.

The fact that the agitator 30 can receive at least three racks 8 makes it possible to ensure optimum speed if it is necessary to repeat a test (also referred to as Rerun/Reflex). In this manner, continuity of speed is ensured even if the three racks only contain one "useful" tube.

Specifically, before undergoing sampling, the tubes must be agitated to an extent sufficient to ensure the homogeneity of the mixture in each tube. This means that when a rack is inserted into the device, the tubes must first be agitated. However, this step requires the equivalent of 4 sampling steps. Accordingly, when two racks can be received, a certain continuity of speed can be ensured by beginning to agitate the tubes of the second rack while the last tubes of the first rack are being sampled.

Nevertheless, in the case of a priority tube or a step of the type Rerun/Reflex, the speed may drop long enough for the tubes to be properly agitated. The third rack makes it possible to continue processing one or two racks while simultaneously agitating the priority tube or the tube of a step of the type Rerun/Reflex. Therefore, the latter are processed as quickly as possible while maintaining the maximum operating speed of the device.

If the agitator 30 receives 4 supports or more, this opens up new possibilities, such as the use of a rack buffer described above, or the possibility of permanently leaving a support empty in order to allow use of the "priority rack," i.e. no longer a single tube, but an entire rack of tubes that will be sampled and analyzed on a priority basis.

Finally, the device 1 can also receive a second agitator similar to the agitator 30. This allows the use of additional buffers, and the lifting mechanism 32 and the changer 34 allow the transfer of one rack to another on the same agitator or between the two agitators.

By means of the new paradigm proposed by the invention, it becomes possible to achieve an actual speed of 120 samplings per hour, even when using priority tubes or with racks having only one useful tube each. In addition to the improved actual rate, the configuration of the device according to the invention opens up new possibilities in handling of tests, as it becomes possible to determine the most rapid sampling route independently of the composition of the racks and their order of insertion into the device 1. Based on the dimensions selected for the components of the device, the speed could be increased, for example to 240 samplings per hour or more.

Within the context of the invention, the applicant conducted further mechanical and functional testing of the components of the device in order to achieve the smoothest operation possible.

This led the applicant to specify step cycles of 15 seconds and to specify the following steps:

a.—loading of a rack from the forward tray and identification of this rack and the tubes it receives,
b.—agitation,
c.—verification of the identifier of a tube, gripping of this tube, supplying it for sampling, and putting the tube back in place,
d.—ejection of a rack toward the forward tray.

Steps a. through d. make it possible to simply manage the interactions in a device not connected to a conveyor and not capable of sorting the tubes and/or racks. The scheduler is configured to manage these steps in an order that makes it possible to optimize the operating speed of the device.

The applicant also discovered that these steps could be extended in order to automate the connection of the device to a conveyor (reference no. 1000 in FIG. 10), thus making it possible to send them to another device for agitating and collection (reference no. 1100 in FIG. 10), which could be in accordance with device 1 according to the invention or different therefrom, and in order to automate sorting of the tubes 10 and/or the racks 8 of the tubes 10 for subsequent automated or manual processing.

In this case, new steps can be specified for management by the scheduler:

e. loading of a rack from the conveyor and identification of this rack,
f. verification of the identifier of a tube, gripping of this tube, supplying it for sampling, then putting this tube back in place, and simultaneously loading of a rack from the waiting area of the conveyor,
g. verification of the identifier of a tube, gripping of this tube, supplying it for sampling, then putting this tube back in place, and simultaneous ejection of a rack toward the waiting area of the conveyor,
h. agitation and identification of a rack,
i. ejection of a rack toward the conveyor,
j. ejection of a rack with displacement on the forward tray,
k. vertical shifting of one or a plurality of tubes of a rack and ejection of this rack on the forward tray with or without displacement of the rack,
l. verification of the identifier of a tube, gripping of this tube, supplying it for sampling, and putting the tube back in a location other than its original location (rack and/or position on the rack),
m. verification of the identifier of a tube, gripping of this tube, supplying it for sampling, then putting this tube back in a location other than its original location (rack and/or position on the rack), and simultaneous loading of a rack (from the waiting area of the conveyor or from another location), n. verification of the identifier of a tube, gripping of this tube, supplying it for sampling, and then putting this tube back in a location other than its original location (rack and position on the rack), simultaneous ejection of a rack (toward the waiting area of the conveyor or toward another location), and o. verification of the identifier of a tube, gripping of this tube, and putting the tube back in a location other than its original location (rack and position on the rack).

Steps e. through i. make it possible to manage the connection of the device of the invention to a more complex system in a testing laboratory. In this case, the device is capable of receiving the tubes 10 and/or the racks 8 of other devices 1100 in the system. This transfer is carried out by a conveyor 1000 that brings the tubes 10 and/or the racks 8 to a dedicated waiting area of the device 1.

Steps j. and k. make it possible to manage the tubes and/or racks for manual sorting. Specifically, an operator who sees at the outlet a vertically displaced tube and/or a displaced rack will know that the latter must be subjected to separate processing, whether this be an additional testing or a repeated testing. Of course, the dimensions of the device (length of the tray, height of the rack outlet) must be adapted accordingly.

Steps a. through k. do not require any adaptation of the logic of the device described above. The insertion of a rack (function Intro( ) of FIG. 9) and the processing of a tube (function Proc( ) of FIG. 9) and/or a rack (function Empt( ) of FIG. 9) can be adjusted so as to insert one or more of steps a. through k. as needed.

For their part, steps l. through o. make it possible to carry out fully automated sorting of the tubes and/or the racks. Specifically, as a tube can be put back in a location different from its original location, this makes it possible to rearrange the group of tubes on different racks in order to take into account the tests remaining to be carried out.

This has several advantages. The sorting devices, whether they are dedicated to storage or circulation of the tubes between multiple devices of the same system, are extremely costly, take up a lot of space, and must be precisely dimensioned relative to the system.

Moreover, if the system changes in size (addition of other devices or reduction in size), the sorting device becomes unsuitable or must even be replaced. In the invention, the dedicated sorting device is simply eliminated, because sorting is internalized. This means lower costs, less space required, less design time (dimensioning), and increased flexibility of scale (regardless of the size of the system, sorting is integrated).

Finally, as sorting is integrated, one can save considerable time in filling the racks. Specifically, it is no longer necessary to prepare the racks by grouping together the tubes for which similar tests are to be carried out in order to pre-sort the tubes. Users may place the tubes in the racks in bulk, regardless of the tests to be conducted, and the device will optimize the distribution of the tubes in the racks.

This type of automated processing is made possible by two characteristics.

The first characteristic is the capacity of the agitator to agitate at least three racks simultaneously, allowing permanent use of one of the three racks as an adjustment destination.

In this manner, as soon as it is determined that a tube must undergo testing different from that of the tubes of its original rack after the current testing, said tube is put back on the adjustment rack after testing. As soon as it is determined that another tube must undergo the same testing, it is also put back on the rack, and so on, until the adjustment rack is full or a time threshold has been exceeded, after which the adjustment rack is withdrawn from the device, toward the conveyor if there is one, or with displacement on the tray in order to indicate to the user the destination of this rack.

In classic operation of the device, the total number of "empty" locations on the racks received (i.e., the number of locations not receiving a tube) is constant, as the tubes that are moved onto another rack or to a location other than their original location leave the latter empty. It remains the case that the adjustment racks are ejected as soon as they are full and are replaced by another full incoming rack.

When the adjustment rack is withdrawn at the request of the user or if a time threshold is exceeded, an empty rack must be inserted into the device in order to restore the capacity for adjustment.

Generally speaking, each additional rack managed by the agitator allows management of a different adjustment destination. Four racks thus make it possible to manage two adjustment destinations, and the addition of a second agitator will make it possible to increase the number of adjustment destinations.

The second characteristic is a change in management of the logic of the device. Specifically, in the case described with reference to steps a. through k., the device is completely independent of the rest of the chain, as a rack will come back out the same way it went in, although the tubes it contains will not necessarily be processed in their order in the rack or another rack may be treated on a priority basis. To put it another way, the device constitutes a closed universe not influenced by other devices, even when it is connected to a conveyor.

In the case of steps l. through o., the device is a link in a chain formed by the system. As such, the management of the device is affected by the general status of the system.

Thus, when a rack is inserted into the device, the device reads the data relating to each of the tubes of this rack, derives from this the destination data for each tube, and updates the list of steps to be carried out for each tube. The destination data indicate the next device to which the tube must be transported after processing, or indicate storage if there is no additional testing. In the example described here, the destination data are determined based on the identifier of the tube by accessing a local or remote database. Alternatively, they can be part of the data read on the tube.

Next, when the time comes to carry out testing of a given tube, i.e. when the device instructs the clamp to grip the tube on the rack, a new reading of the data pertaining to the tube is carried out in order to determine whether the destination data of the tube after the current testing are identical to those of the rack that receives them. If this is the case, step c., f., or g. is carried out depending on what is provided for optimizing speed. If not, step l., m., or n. is carried out.

Initially, no rack has destination data. It is at the time of sampling of the first tube the rack receives that it may be assigned destination data. Specifically, according to the invention, when no rack has destination data identical to that of the tube, this destination data is assigned to the oldest rack.

Alternatively, the racks could be assigned destination data based on the destination data of the tubes they receive and on the destination data of the other racks that are already loaded at the time of loading the rack into the device.

In this manner, as the tubes are processed, the arrangement thereof and their distribution on the racks loaded into the device are modified. For example, when a tube has been put back in a rack different from its original rack, if the following tube of the original rack is put back in the original rack, it will be placed not in its original location but in the location left empty by the preceding tube.

In a similar manner, if a tube of a given rack is not to be tested but has destination data different from that of the rack that receives it, specific movement of the tube by the clamp can be carried out (step o.). This is also the case if a tube received on a rack already loaded into the device has its testing modified and no longer corresponds to the analysis or tests for which the device is intended.

Among the steps described above, step o. is the only one capable of affecting speed in that it does not provide for any testing. Nevertheless, this situation should be extremely rare in practice, and it cannot be avoided.

It thus appears that although the device functions according to the same principles as those set forth above and makes it possible to obtain similar advantages, its logic is different, as external events may affect its operation.

For example, the user may decide to add a supplementary test not planned at the outset for a tube that is already in the system. In this case, the tube will most probably be moved toward a destination adjustment rack during one of its processing runs. In addition, all of the subsequent tubes will also be moved to a location different from their additional location. Despite this, the speed will remain at the maximum level by means of the device of the invention.

The examples given for implementing steps 1. through o. were described with reference to a system comprising a plurality of devices connected by a conveyor. Nevertheless, they can be fully combined with steps j. and k. even without a conveyor. Specifically, the racks having selected destination data can be displaced on tray 4 or 6 according to a distance characteristic of the destination in question. Moreover, the corresponding destination data can be displayed nearby for each rack.

In the above, the duration of the steps was set at 15 seconds, a duration that provides a good compromise between the granularity of the steps and the efficiency of scheduling, specifically in view of the desired rate of 120 samplings per hour. Alternatively, other durations could be selected based on trade-offs and the desired rates.

In general, each time a rack that has been inserted empty into the device is retrieved "by force," i.e., at the request of the user, or after a time threshold is exceeded, whether this occurs toward a conveyor or toward a tray, it must be replaced. This replacement can be carried out manually or automatically (for example via the conveyor).

In the examples described above, the changer 34 is used for moving the tubes between the rack that receives them and one or more sampling means. The changer 34 could also move the rack containing the tube to be sampled. However, this is not essential to the invention as specified with respect to the scheduler. Specifically, the same advantages as those described above with respect to insertion of a scheduler into the device can be obtained without a changer, for example by moving all or part of the sampling means and carrying out sampling directly in the rack.

In this case, steps a. through o. could be adapted and/or modified to take into account that gripping of the tubes is no longer necessary for sampling, the movement of the sampling means must be controlled, and the vertical displacement of a tube in the rack that receives it or toward another position and/or another rack must be carried out by a specific means.

Moreover, the device described above is configured to carry out a certain number of tests after sampling of the tubes. Alternatively, the device could be limited to sampling alone, and the analyzer could be remote from the unit.

Although the above description has pertained to blood products, the invention can be applied in the processing of all types of biological liquids, particularly body fluids.

The invention claimed is:

1. A device for agitating and collecting biological liquid samples comprising:
    an agitator configured to agitate racks of a plurality of tubes and is capable of moving between a first position for inserting the racks into the device and a second position for removing the racks from the device, wherein the plurality of tubes are positioned in the racks in an order and/or the racks are inserted into the device in an order;
    a sampling apparatus capable of collecting a biological liquid sample in a tube;
    a scheduler configured to specify a sampling order from the plurality of tubes independently of the order in which the tubes are positioned in the racks and/or the order in which the racks are inserted into the device, wherein the scheduler is further configured to control the agitator and the sampling apparatus to process the tubes according to the sampling order; and
    a changer capable of gripping a tube on a rack in the agitator and moving the tube to the sampling apparatus, wherein the changer comprises a projection arranged to cooperate with a rack base for removing a rack from the agitator when the agitator is in second position.

2. The device as claimed in claim 1, wherein the scheduler controls the order in which the changer grips the tubes according to the sampling order.

3. The device as claimed in claim 1, wherein the agitator is capable of agitating at least three racks simultaneously.

4. The device as claimed in claim 1, further comprising a lifting mechanism arranged to move the agitator between the first position and the second position.

5. The device as claimed in claim 1, further comprising a loader equipped with a pusher arranged to cooperate with a rack base of a rack in order to insert a rack into the agitator when the agitator is in the first position.

6. The device as claimed in claim 1, wherein the changer comprises a clamp for removing a tube from a rack.

7. The device as claimed in claim 1, wherein the changer comprises a sensor arranged to read data pertaining to the tubes in a rack in the agitator and/or on the rack itself.

8. The device as claimed in claim 1, wherein the changer comprises a barrel for receiving a tube to be treated on a priority basis.

9. The device as claimed in claim 1, wherein the agitator receives a rack serving as a buffer for the scheduler in specifying the order of gripping the tubes.

10. A process for agitating and sampling tubes, comprising:
    a. inserting at least two racks into a device for agitating and collecting biological liquid samples, the first of the at least two racks receiving at least one first tube and the second of the at least two racks receiving at least one second tube, wherein each of the first and second tubes contain at least one biological liquid,
    b. specifying a sampling order of the at least first and second tubes received in the device independently of their position on the first and second racks, respectively, and/or the order in which the at least two racks are introduced into the device, and c. collecting biological liquid samples in the at least first and second tubes received in the device according to the sampling order, wherein said device comprises an agitator configured to agitate the at least two racks and is capable of moving between a first position for inserting the racks into the device and a second position for removing the racks from the device, a sampling apparatus capable of collecting a biological liquid sample in a tube, and a changer capable of gripping a tube on a rack in the agitator and moving the tube to the sampling apparatus, wherein the changer comprises a projection arranged to cooperate with a rack base for removing a rack from the agitator when the agitator is in second position.

11. A device for agitating and collecting biological liquid samples comprising:

an agitator configured to agitate racks of a plurality of tubes and is capable of moving between a first position for inserting the racks into the device and a second position for removing the racks from the device, wherein the plurality of tubes are positioned in the racks in an order and/or the racks are inserted into the device in an order;

a sampling apparatus capable of collecting a biological liquid sample in a tube;

a scheduler configured to specify a sampling order from the plurality of tubes independently of the order in which the tubes are positioned in the racks and/or the order in which the racks are inserted into the device, wherein the scheduler is further configured to control the agitator and the sampling apparatus to process the tubes according to the sampling order; and a loader equipped with a pusher arranged to cooperate with a rack base of a rack in order to insert a rack into the agitator when the agitator is in the first position.

12. The device as claimed in claim 11, further comprising a changer capable of gripping a tube on a rack in the agitator and moving the tube to the sampling apparatus, wherein the scheduler controls the order in which the changer grips the tubes according to the sampling order.

13. The device as claimed in claim 11, wherein the agitator is capable of agitating at least three racks simultaneously.

14. The device as claimed in claim 11, further comprising a lifting mechanism arranged to move the agitator between the first position and the second position.

15. The device as claimed in claim 12, wherein the changer comprises a projection arranged to cooperate with a rack base for removing a rack from the agitator when the agitator is in second position.

16. The device as claimed in claim 12, wherein the changer comprises a clamp for removing a tube from a rack.

17. The device as claimed in claim 12, wherein the changer comprises a sensor arranged to read data pertaining to the tubes in a rack in the agitator and/or on the rack itself.

18. The device as claimed in claim 12, wherein the changer comprises a barrel for receiving a tube to be treated on a priority basis.

19. The device as claimed in claim 11, wherein the agitator receives a rack serving as a buffer for the scheduler in specifying the order of gripping the tubes.

* * * * *